United States Patent
Rehan et al.

(10) Patent No.: US 12,472,078 B2
(45) Date of Patent: Nov. 18, 2025

(54) INTRAMEDULLARY PROSTHESIS REMOVAL SYSTEMS AND METHODS THEREOF

(71) Applicant: Howmedica Osteonics Corp., Mahwah, NJ (US)

(72) Inventors: Md Rehan, Gurgaon (IN); Philip Harris Frank, Maplewood, NJ (US); Prateek Sharma, Jaipur (IN); Mayur Dhawale, Yavatmal (IN); Prabhanjan Nimkar, Thane (IN); Venus Vermani, Palampur (IN); Rahul Soni, Anuppur (IN); Subhash Jangid, Gurgaon (IN)

(73) Assignee: Howmedica Osteonics Corp., Mahwah, NJ (US)

( * ) Notice: Subject to any disclaimer, the term of this patent is extended or adjusted under 35 U.S.C. 154(b) by 205 days.

(21) Appl. No.: 18/226,011

(22) Filed: Jul. 25, 2023

(65) Prior Publication Data
US 2024/0024127 A1    Jan. 25, 2024

Related U.S. Application Data

(60) Provisional application No. 63/391,870, filed on Jul. 25, 2022.

(51) Int. Cl.
*A61F 2/46* (2006.01)
*A61B 17/56* (2006.01)

(52) U.S. Cl.
CPC ...... *A61F 2/4607* (2013.01); *A61B 2017/564* (2013.01); *A61F 2002/4619* (2013.01)

(58) Field of Classification Search
CPC . A61B 17/92; A61B 17/921; A61B 2017/922; A61B 2017/924; A61B 17/149;
(Continued)

(56) References Cited

U.S. PATENT DOCUMENTS

| | | | |
|---|---|---|---|
| 4,709,699 A | 12/1987 | Michael et al. | |
| 5,290,291 A * | 3/1994 | Linden | A61B 17/8847 606/86 R |

(Continued)

FOREIGN PATENT DOCUMENTS

DE    4041063 A1    6/1992

OTHER PUBLICATIONS

YouTube video clip titled "GWHIP Prototyping," uploaded on Dec. 3, 2019 by user "Sabrina Chen". Retrieved from Internet: <https://www.youtube.com/watch?v=ve8VZLbctPM>.
(Continued)

*Primary Examiner* — Anu Ramana
(74) *Attorney, Agent, or Firm* — Lerner David LLP

(57) ABSTRACT

A method for removing a hip stem from bone comprises drilling a channel through the bone adjacent to the hip stem from a proximal end to a distal end thereof, the channel defining a longitudinal first axis. The method further comprises drilling a hole along a second axis through the bone adjacent to a distal end of the hip stem such that the channel and the hole intersect. The method additionally comprises inserting a first end of a cutting wire through the channel and the hole and cutting an interface between the hip stem and the bone with the cutting wire.

20 Claims, 12 Drawing Sheets

(58) Field of Classification Search
CPC . A61B 17/15; A61B 17/175; A61B 2017/564; A61F 2/4607; A61F 2002/4619; A61F 2002/462

See application file for complete search history.

(56) References Cited

U.S. PATENT DOCUMENTS

| | | |
|---|---|---|
| 5,885,301 A | 3/1999 | Young |
| 6,187,012 B1 | 2/2001 | Masini |
| 6,790,211 B1 | 9/2004 | McPherson et al. |
| 9,700,328 B2 | 7/2017 | Chana et al. |
| 2015/0057666 A1 | 2/2015 | Kelley |
| 2022/0323134 A1* | 10/2022 | Lyon ................. A61B 17/92 |

OTHER PUBLICATIONS

Stryker, "Accolade II, Designed to fit more patients, designed to fit your approach", [online] [retrieved Jul. 19, 2023]. Retrieved from Internet: <https://www.stryker.com/us/en/joint-replacement/products/accolade-ii.html>. 10 pgs.

* cited by examiner

INTRAMEDULLARY PROSTHESIS REMOVAL SYSTEMS AND METHODS THEREOF

CROSS-REFERENCE TO RELATED APPLICATIONS

This application claims priority to U.S. Provisional Application No. 63/391,870, filed Jul. 25, 2022, the entire contents of each of which are incorporated herein by reference.

BACKGROUND OF THE INVENTION

Many articulating joints of the body, such as the joints of the hips, have anatomical ball and socket connections between bones of the joints providing a wide range of motion. The hip joint, for instance, includes a socket or acetabulum in the pelvis and a femoral head or ball at an upper end of the femur or thigh bone received in the acetabulum. A hip joint prosthesis may be implanted into a patient when the patient's native hip joint becomes compromised. Hip prostheses often include a stem portion that extends within a medullary canal of a femur and a ball portion that extends from the stem portion toward the acetabulum. Such hip stems may be secured to the bone via bone cement or a press-fit connection. Where a press-fit connection is utilized, the hip stem may include a porous material that facilitates bone growth. Occasionally, implants in some patients need to be removed due to wear, implant failure, infection, implant loosening, and the like. However, extracting a hip stem from a femur without damaging or removing excess bone can be difficult.

An extended trochanteric osteotomy (ETO) is typically utilized to extract a well-fixed hip stem. An ETO generally involves making a cut along the lateral femur from the greater trochanter down to at least the tip of the stem of the implanted femoral prosthesis. This allows a surgeon to create and remove a window of bone that exposes the underlying femoral stem and allows access to the stem. This method is not without drawbacks not least of which is the extensive amount of bone that is cut away to access the stem and which needs to heal back together resulting in extensive recovery time, an increased risk of infection, and pain. Further, an ETO may require various instruments like osteotomes, burrs, and slap hammers to remove the well-fixed stem, and the required instrumentation may vary from patient to patient.

A standardized surgical method that is less invasive and traumatic than an ETO and does not require the creation of a window in the patient's bone is desired.

BRIEF SUMMARY OF THE INVENTION

In one aspect, a method for removing a prosthetic hip stem from bone comprises drilling a channel through the bone adjacent to the prosthetic hip stem from a proximal end to a distal end thereof, the channel defining a longitudinal first axis; drilling a hole along a second axis through the bone adjacent to a distal end of the prosthetic hip stem such that the channel and the hole intersect; inserting a first end of a cutting wire through the channel and the hole; and cutting an interface between the prosthetic hip stem and the bone with the cutting wire.

In another aspect, the method further comprises attaching a targeting guide to the implant.

In a different aspect, the attaching step includes attaching the targeting device to a trunnion of the prosthetic hip stem.

In a further aspect, the method further comprises removing a head from the trunnion prior to the attaching step.

In another aspect, the step of drilling the hole along the second axis includes driving a drill bit through a hole of the targeting guide toward the bone.

In yet another aspect, the method further comprises adjusting an arm of the targeting guides so that a longitudinal third axis thereof is parallel to the first axis.

In a different aspect, the method further comprises attaching a bone protector pin to the hole in the bone.

In a further aspect, the inserting step includes inserting the cutting wire through the bone protector pin.

In a different aspect, the cutting step includes moving the cutting wire back and forth along the first and second axes.

In another aspect, the attaching step includes inserting the bone protector pin through a targeting device attached to the prosthetic hip stem.

In a different aspect, the attaching step includes inserting the bone protector pin directly into the hole.

In yet another aspect, the method further comprises removing the targeting device from the hip stem while the bone protector pin remains attached to the bone.

In another aspect, the step of drilling the hole includes drilling the hole at an oblique angle relative to the channel.

In a further aspect, the oblique angle is formed by an intersection between the first and second axes and is 30 degrees.

In a different aspect, the hole extends into the bone in a direction toward the proximal end of the bone.

In another aspect, the step of drilling the hole through the distal end of the hip stem includes drilling the hole distal to the distal end of the prosthetic hip stem.

In yet another aspect, the step of drilling the hole through the distal end of the hip stem includes drilling the hole 3 cm to 6 cm offset from the distal end of the hip stem.

In a different aspect, the step of drilling the channel includes drilling a K-wire from the proximal end of the bone to a location beyond the distal end of the prosthetic hip stem and inserting a hollow tube in the channel.

In a further aspect, the location is 3 cm to 6 cm beyond the distal end of the prosthetic hip stem.

In another aspect, the interface includes bone cement.

In a different aspect, a method of removing an implant from bone comprises: drilling a channel through the bone adjacent to the implant from a first end of the implant to a second end of the implant; attaching a targeting guide to the first end of the implant; subsequent to positioning the drill, drilling a hole into the bone such that the hole intersects the channel adjacent to the second end of the implant; inserting a first end of a cutting wire through the channel and the hole; and cutting at least one of bone and bone cement adjacent to the implant with the cutting wire.

In another aspect, the method further comprises assessing the length of the implant.

In a further aspect, the method further comprises selecting a first guide hole of a plurality of guide holes in the targeting device to drill through based on the assessed length of the implant.

In yet a further aspect, the first guide hole defines a guide axis intersecting the bone at a location 3 cm to 6 cm offset from the second end of the implant.

In another aspect, the method comprises attaching handles to the first end of the cutting wire and a second end of the cutting wire.

In a different aspect, the method further comprises inserting the first end of the cutting wire through a bone protector pin extending into the bone at the second end of the implant.

In another aspect, the method further comprises removing the implant via a slap hammer.

In a different aspect, the implant is a hip stem.

In a further aspect, a system for removing an implant from bone comprises a Kirschner wire configured to be connected to a drill and drilled into bone; a targeting guide having a first portion and a second portion, the first portion having a plurality of guide holes, the second portion being configured to connect to the implant such that the first portion extends alongside the implant; a drill bit configured to be connected to the drill and driven through one of the guide holes in the targeting guide and into bone; a cutting wire having first and second ends and a length extending therebetween, the cutting wire being flexible along its length; and a bone protector pin having a first end, a second end, and an opening extending through the first and second ends, the first end being configured to connect to a bone hole in bone, the opening being dimensioned to receive the cutting wire.

In another aspect, the cutting wire is a flexible cutting wire.

In yet another aspect, the second portion of the targeting guide is configured to connect to a trunnion of the implant.

In a different aspect, the first portion of the targeting guide defines a longitudinal axis thereof, each of the guide holes of the first portion having a hole axis oriented at an oblique angle relative to the longitudinal axis of the first portion.

In another aspect, the oblique angle is between 30 degrees and 60 degrees.

In a further aspect, each hole of the first portion of the targeting guide associated with an implant of different size.

In a different aspect, the first portion of the targeting guide is moveable relative to the second portion.

BRIEF DESCRIPTION OF THE DRAWINGS

The features, aspects, and advantages of the present invention will become better understood with regard to the following description, appended claims, and accompanying drawings in which:

DETAILED DESCRIPTION

Reference will now be made to the various embodiments of the present disclosure. Wherever possible, the same or like reference numbers will be used throughout the specification and drawings to refer to the same or like features within different embodiments represented by different series of numbers (e.g., 100-series, 200-series, etc.). Although the methods disclosed herein may be referred to in a particular sequence, the present disclosure is not limiting the methods to those sequences, and the methods may be performed in any sequence of steps disclosed herein. As used herein, when referring to bones or other parts of the body, the term "proximal" means closer to an operator, and the term "distal" means further away from the operator. The term "anterior" means toward the front of the patient's body, and the term "posterior" means toward the back of the patient's body. The term "inferior" means toward the patient's feet, and the term "superior" means towards the patient's head. The term "medial" means toward the midline of the body, and the term "lateral" means away from the midline of the body.

As used herein, the terms "about," "approximately," "generally," and "substantially" are intended to mean that slight deviations from absolute are included within the scope of the term so modified. To aid the Patent Office and any readers of any patent issued based on this application in interpreting the claims appended hereto, Applicant notes that it does not intend any of the appended claims or claim elements to invoke 35 U.S.C. § 112(f) unless the words "means for" or "step for" are explicitly used in the particular claim.

Figure 1:
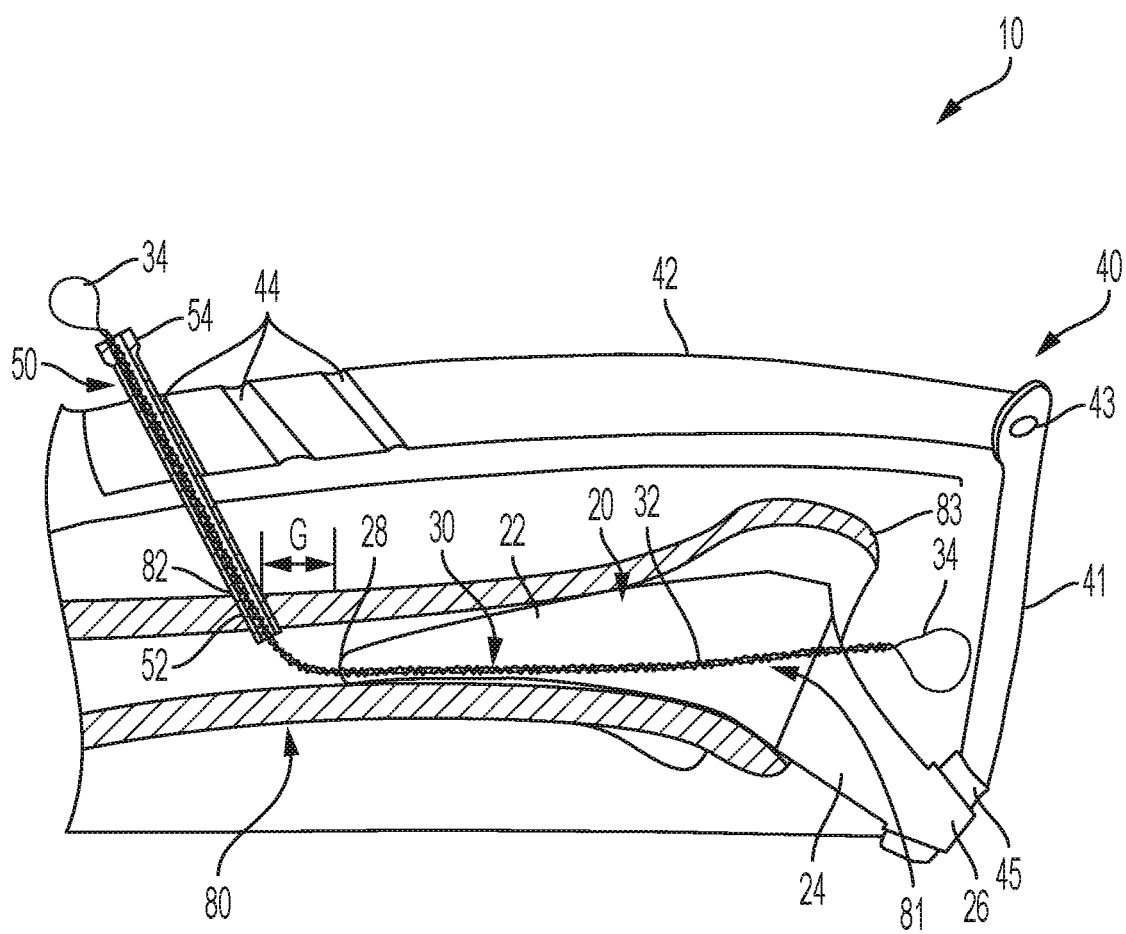
FIG. 1 is a cross-sectional view of a system for removing a well-fixed femoral stem component from a proximal femur according to an embodiment of the disclosure.

FIG. 1 illustrates a system 10 for removing a well-fixed femoral stem component 20 of a total hip prosthesis which generally includes femoral stem component 20 and a modular femoral head component (not shown). Femoral stem component 20 and the femoral head component can be any femoral stem component and femoral head component of any currently existing total hip prostheses including those that are cemented or press-fit into a proximal femur. For example, femoral stem component 20 and the head component can be those from the Accolade II, Exeter, MDM, or Restoration Modular hip systems of Howmedica Osteonics Corp. (Mahwah, NJ). Femoral stem component or implant 20 includes a stem portion 22, neck 24 and a trunnion 26. Trunnion 26 is generally adapted to couple to the femoral head component and, in this regard, may be tapered along its length so as to be received within a correspondingly tapered opening of the femoral head component.

The system 10 generally includes a K-wire 60, (see FIGS. 1-3), flexible saw 30, targeting guide 40, and bone protector pin 50. Targeting guide 40 is configured to be attached to the previously implanted hip stem component 20 and extends alongside the patient's limb and stem component 20 therein, as discussed in more detail below. The targeting guide 40 allows a user to drill a bore 82 (see FIG. 5) into bone 80 through a guide hole 44 of targeting guide 40. A bore or channel 81 (see FIG. 4) can be drilled longitudinally through the femur 80 from an exposed proximal end towards a distal tip 28 of femoral stem component 20. Flexible saw or wire 30 is passed through bore 82 to allow an operator to cut through the bone cement and/or bone surrounding femoral stem component 20 such that it can be removed without the need for removing a window of bone along a lateral side of the patient's femur or removing a significant amount of bone along with femoral stem component 20.

Figure 2:
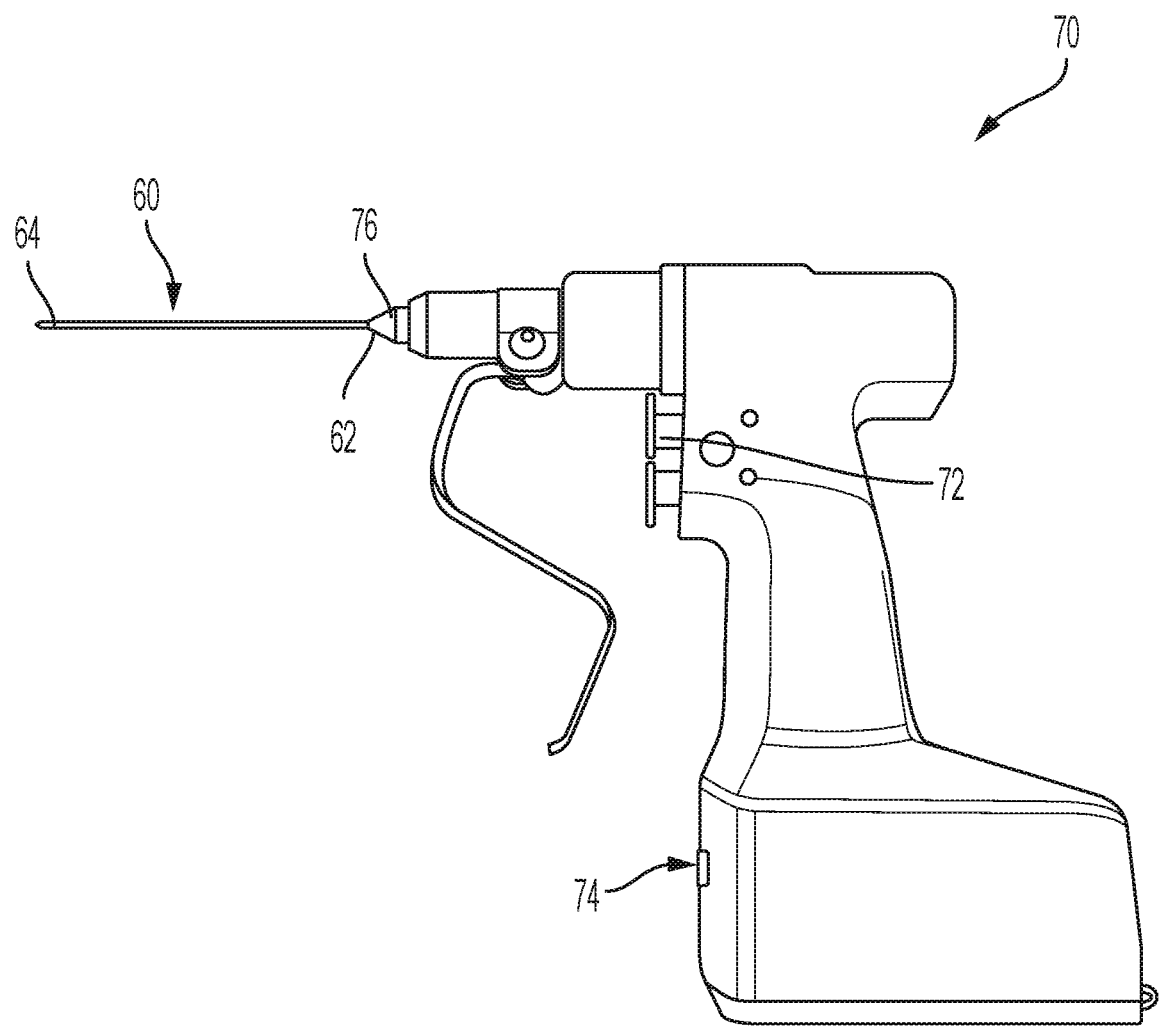
FIG. 2 is a perspective view of a K-wire of the system of FIG. 1 attached to a drill.

FIG. 2 shows a drill 70 with a K-wire 60 attached thereto. Drill 70 may be any surgical drill known in the art. Drill 70 includes a power source 74, such as a battery, a trigger 72 to actuate rotation and switch the rotation direction of a drill bit, and a chuck 76 to secure the K-wire 60 or another drill bit to drill 70.

K-wire 60, also known as a Kirschner wire, extends longitudinally from a proximal end 62 to a distal end 64. Distal end 64 may taper to a sharp point to assist with guiding K-wire through bone. K-wire 60 is formed in a smooth, cylindrical shape from a sufficiently stiff material, such as stainless steel, that allows the K-wire to be driven into bone without deforming to define a cylindrical bore without rough edges. The diameter of the cylindrical bore is generally larger than a diameter of saw 30 that will be utilized to cut around femoral stem component 20. The length of K-wire 60 may be at least as long as the length of femoral stem component 20 so that K-wire 60 can be drilled into bone 80 (see FIG. 3) to form a channel 81 (see FIG. 4), also referred to as a first bore 81, that extends beyond the distal tip 28 of femoral stem component 20. In this manner, various size K-wires may be provided depending on the anatomy of the patient and diameter of the flexible saw required.

As shown in FIG. 1, targeting guide 40 is attachable to the trunnion 26 of femoral stem component 20 after the modular femoral head component has been removed. Targeting guide 40 includes a first arm 41 and a second arm 42 which connect to each other at a hinge 43. First arm 41 may attach to the trunnion 26 via a coupling device 45 located at a proximal end of first arm 41. Coupling device 45 can be any device configured to secure to trunnion 26 of a femoral stem component 20. In this regard, coupling device 45 can be a clamp, collar with a tapered opening, fastener, pressure fit, or the like. In other embodiments, arm 41 may attach to another aspect of femoral stem component 20, such as a threaded opening which may be located at a proximal end of stem portion 22 adjacent to neck 24, for example. As such, proximal end of first arm 41 may have a threaded fastener connected thereto.

As shown, first arm 41 is generally straight. However, in other embodiments first arm 41 may be arc-shaped or curved so as to extend up, over and around the greater trochanter 83 of the femur 80. The distal end of first arm 41, in the embodiment depicted, is attached to a hinge 43. Hinge 43 can be a latch hinge, a spring-loaded hinge, and the like, and allows the first and second arms 41, 42 to extend at various angles relative to each other. In a preferred embodiment, the first arm 41 extends at an angle relative to a longitudinal axis of femoral stem component 20 and the second arm 42 extends substantially parallel to an axis of femur 80 while in use, as discussed in more detail below. Further, the coupling device 45 between first arm 41 and trunnion 26 preferably allows aiming device 40, and in particular second arm 42, to rotate about the longitudinal axis of femoral stem component 20 at a rotation point where first arm 41 attaches to trunnion 26. Such a design allows the targeting guide 40 to be placed at any side of the implant desirable based on the approach taken to access the bone and to make minor positional adjustments, as needed.

Second arm 42 extends distally from hinge 41. A plurality of guide holes 44 are formed entirely through second arm 42 and allow an operator to aim a drill bit toward bone 80 at or adjacent to a distal end of femoral stem component 20. As such, guide holes 44 may extend through second body at a plurality of angles. In the embodiment depicted in FIG. 1, there are three guide holes 44 that extend along parallel axes at 30° angles relative to a longitudinal axis of second arm 42 and directed in a direction toward the distal tip 28 of femoral stem component 20 (i.e., in a distal to proximal direction). Each guide hole 44 may be separated by a distance, such as 3 cm, that allows for each guide hole 44 to correspond to a certain length implant. In this regard, it is preferable that each guide hole 44 is oriented to point at a location of a bone offset by a gap G from distal tip 28. Such gap G may be 1-6 cm offset from distal tip 28 of a particular length femoral stem component 20 when targeting guide 40 is connected thereto. However, in other embodiments, there may be more or less than three guide holes 44 and each guide hole 44 may be configured to aim at a different location relative to a particular length femoral stem component 20, such as its distal tip 28, for example. It is foreseeable that other angles or non-parallel arrangements of guide holes 44 can be implemented in second arm 42, particularly in situations where second arm 42 does not extend substantially parallel to femur 80. Guide holes 44 have a diameter configured to accept a drill bit or K-wire that drills a second bore 82 through a lateral portion of the patient's tissue and femur to intersect the first bore 81 created by K-wire 60.

Figure 13:
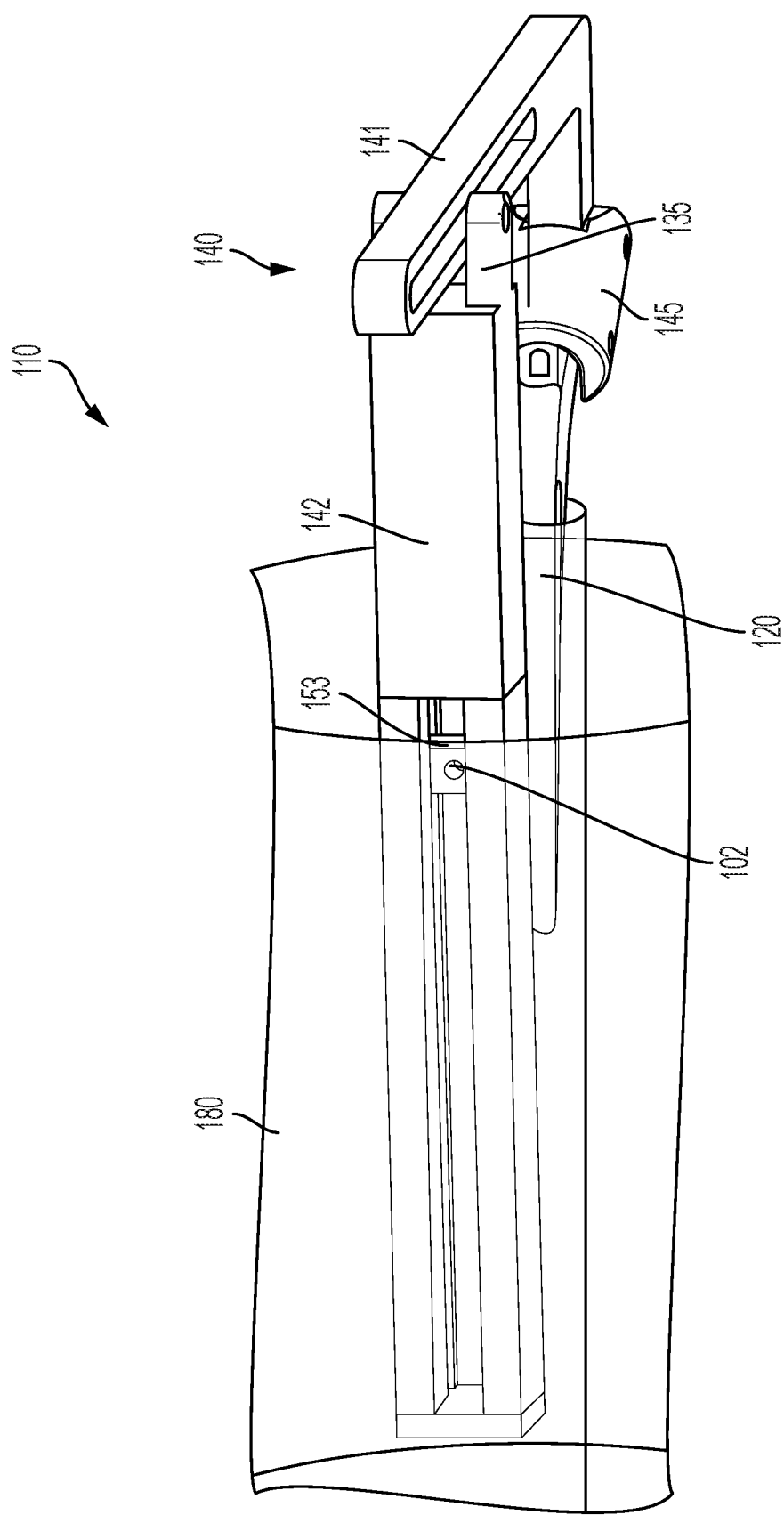

FIGS. 10-14 illustrate another embodiment of a system for removing a hip stem previously fixed-in-place in a patient. In this embodiment, system 110 is similar to system 10, and therefore like elements in the 100-series numerals refer to like elements in the 10-series of numerals. System 110 includes a targeting guide 140, coupling device 145, and a band 155. Each component will be described in detail below. Targeting guide 140 may be attachable, via a first arm 141, to a coupling device 145, which is coupled to trunnion 126. Thumbscrews or other fasteners may be inserted into holes 149 of coupling device 145 to secure first arm 141 and trunnion 126 therein. Coupling device 145 is preferably cylindrical or rectangular and is pivotable about thumbscrews or other fasteners insertable into holes 149 to aid in the alignment of second arm 142. Continuing with this embodiment, first arm 141 may have a slot 151 configured to slidably receive an extension portion 136 of second arm 142. Extension portion 136 may include two tab portions extending longitudinally and a pin extending laterally between the two tab portions. As shown in FIG. 13, second arm 142 may include a slider 153 configured to translate along the length of second arm 142 to a desired location and lock in position to act as a stable drill guide for forming a second bore 182 in the femur. Slider 153 includes a central hole 102 that may function as the drill guide. Further, slider 153 may include one or more additional components to control locking of the slider 153 in position along slot 151. These components may include, for example, tabs, grooves, fasteners, ratcheting, thumbscrews, or other similar locking mechanisms. As described in greater detail elsewhere in the present application, second bore 182, when formed by the system, is configured to extend at a transverse angle relative to the longitudinal axis of a first bore 181 and intersect first bore 181 at a point distal of the distal tip 128 of stem portion 122. Second bore 182 allows for an exit point for a flexible cutting saw such that the saw can be used to cut an interface 86 between the hip stem 122 and the surrounding bone 180.

First and second arms 141, 142 may be linear and provide a stable locking connection for targeting 140. In alternative embodiments, first and second arms 141, 142 may be curved or otherwise formed to optimize the position of first and second arms 141, 142. Second arm 142 of targeting guide 140 may be secured to the patient using a band 155. Band 155 may wrap entirely around the circumference of the patient's leg to ensure that second arm 142 does not move relative to the patient's leg. Various types of bands may be implemented to secure second arm 142, such as flexible bands, ratcheting bands, and the like. Band 155 may secure the entirety of second arm 142 to a patient's leg such that first arm 141 may be removed from second arm 142 without dislodging second arm 142 to allow an operator to have greater access to the proximal end of femoral stem component 120. Band 155 may be attached to second arm 142 by insertion of a portion of band 155 through an opening within second arm 142. Alternative connection methods such as wrapping band 155 entirely around second arm 142 or securing band 155 to second arm 142 with a fastener may be implemented.

Figure 6:
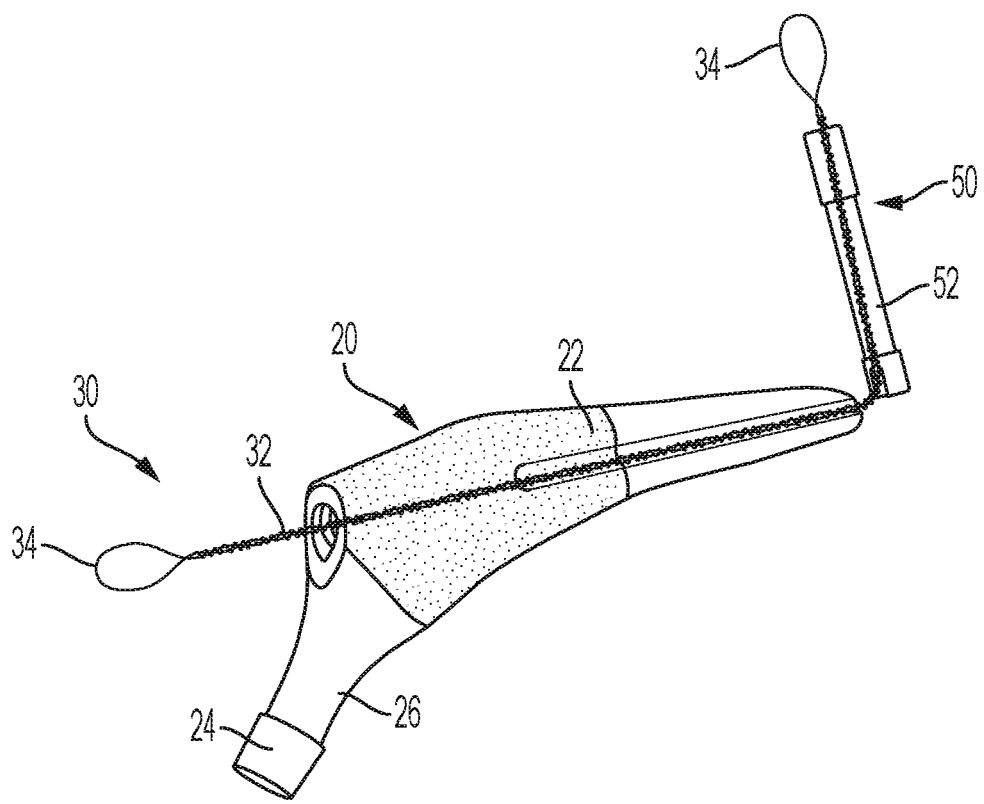

Returning to the embodiment of FIG. 1, FIGS. 1 and 6 illustrate bone protector pin 50 according to one embodiment of the present disclosure. Bone protector pin 50 is generally configured to connect to the second arm 42 of targeting device 40 and/or the bone 80. In this regard, bone protector pin 50 may be a cylindrical post with a cannula 54 extending therethrough and external threads 52 configured to engage targeting guide 40 and/or bone 80. However, in other embodiments, bone protector pin 50 and second arm 42 may form a quick connect mechanism, such as a ball-detent mechanism or snap-fit mechanism, for example, for securing bone protector pin 50 to second arm 42 and partially within bone 80. Regardless of how bone protector pin 50 is connected to bone 80 and/or targeting guide 40, its distal end will be positioned within a bore 82 extending through the cortical bone of bone 80 so that bone protector pin 50 effectively shields bone 80 from flexible saw 30 as it is moved back and forth to remove femoral stem component 20, as described in more detail below.

Figure 7A:
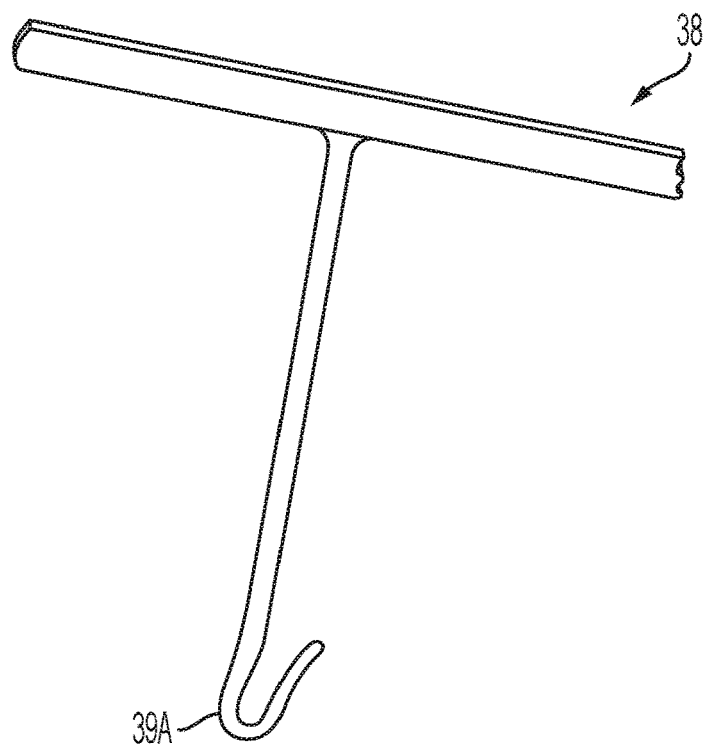
Figure 7B:
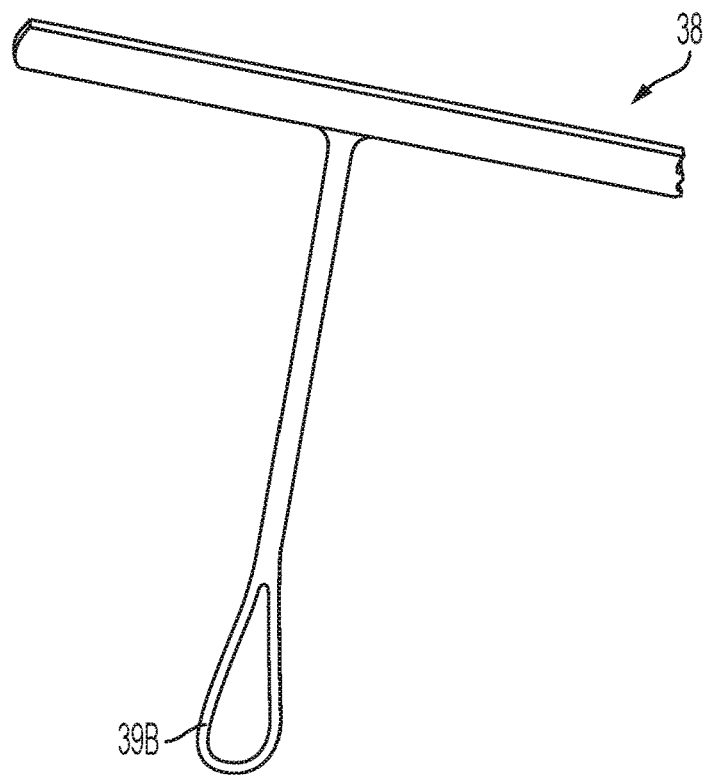

FIGS. 1 and 6 depicts a flexible saw 30 implemented to cut through bone and/or bone cement at an interface 86 with stem portion 22 of femoral stem component 20. Such saw 30 may be a Gigli saw, for example. Flexible saw 30 includes a flexible cutting wire 32 extending between two grasping tools, such as handles 38. Flexible cutting wire 32 may be comprised of a single strand of metal or multiple thin strands of metal wire, such as stainless-steel wire, for example, that are twisted together to form a braided configuration that is sharp and provides a cutting texture. The cutting wire 32 may be optimized in at least its length, material, and number of strands braided together to make up the cutting wire 32. Loops 34 may be formed at the ends of flexible cutting wire 32 to secure such ends to respective grasping tools, such as grasping tool 38*a*, 38*b* shown in FIGS. 7A and 7B. The loop ends 34 may be formed by manually looping ends of wire 32 around themselves and forming a splice to secure the ends with the body of the cable, for example. Handles 38 are configured as grasping tools to enable an operator to grasp the flexible cutting wire 32 within the bone 80. As such, the handles are preferably T-shape or another shape that can be easily grasped and manipulated. The distal end of grasping tool 38 includes a grasping feature 39, which may be a ring, hook, or the like. As illustrated in FIG. 7A, grasping tool 38 may include an open hook portion 39A that allows an operator to quickly attach grasping tool 38 to a loop 34 disposed at an end of flexible saw 30. In another embodiment illustrated in FIG. 7B, grasping tool 38 may include a loop portion 39B at a distal end of the tool that is configured to receive a portion of the flexible saw 30 therein. Although the embodiments described herein are exemplified by a Gigli saw/wire, other flexible saw designs can be implemented using the surgical method and system provided herein.

Figure 9:
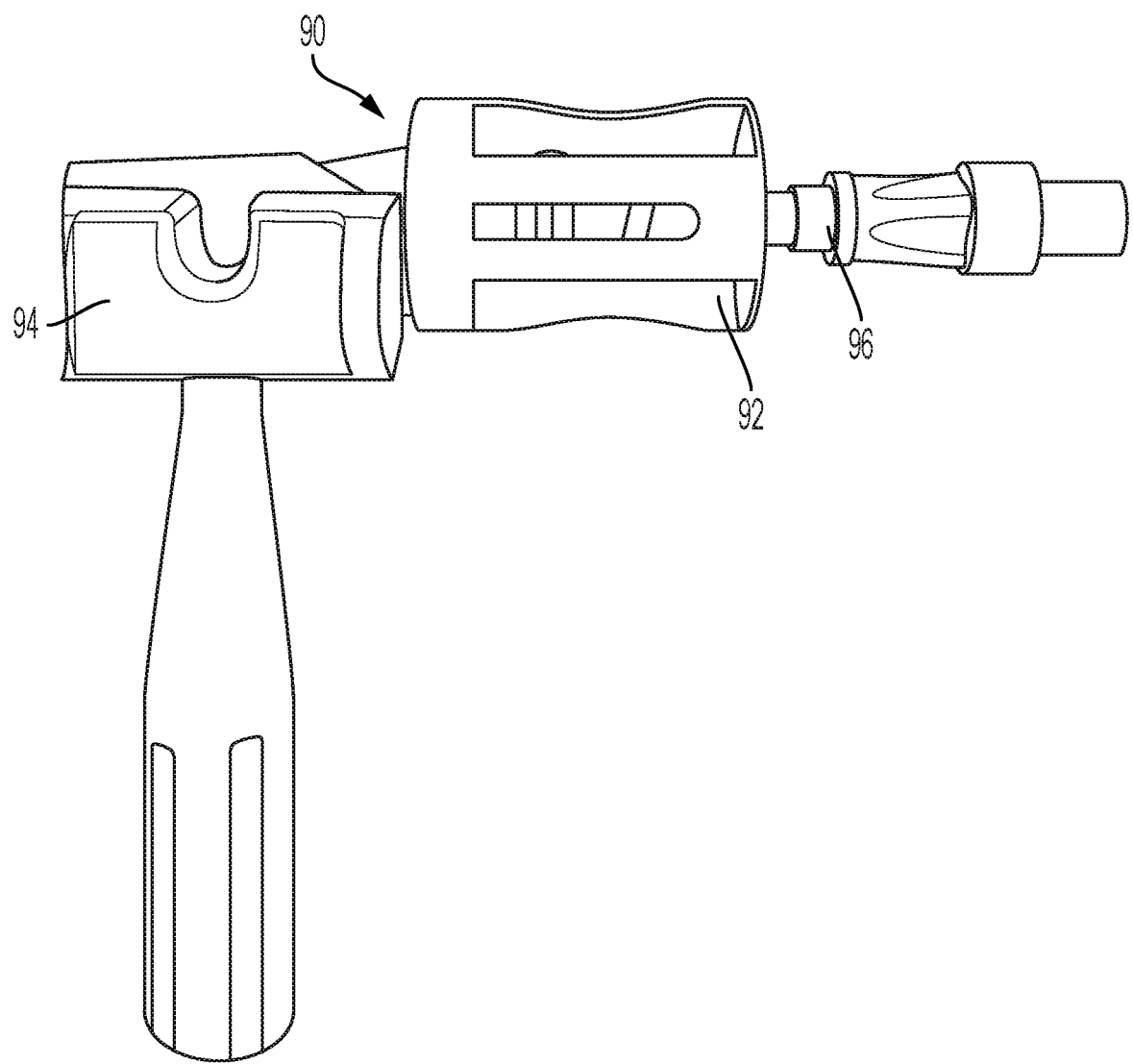
Figure 10:
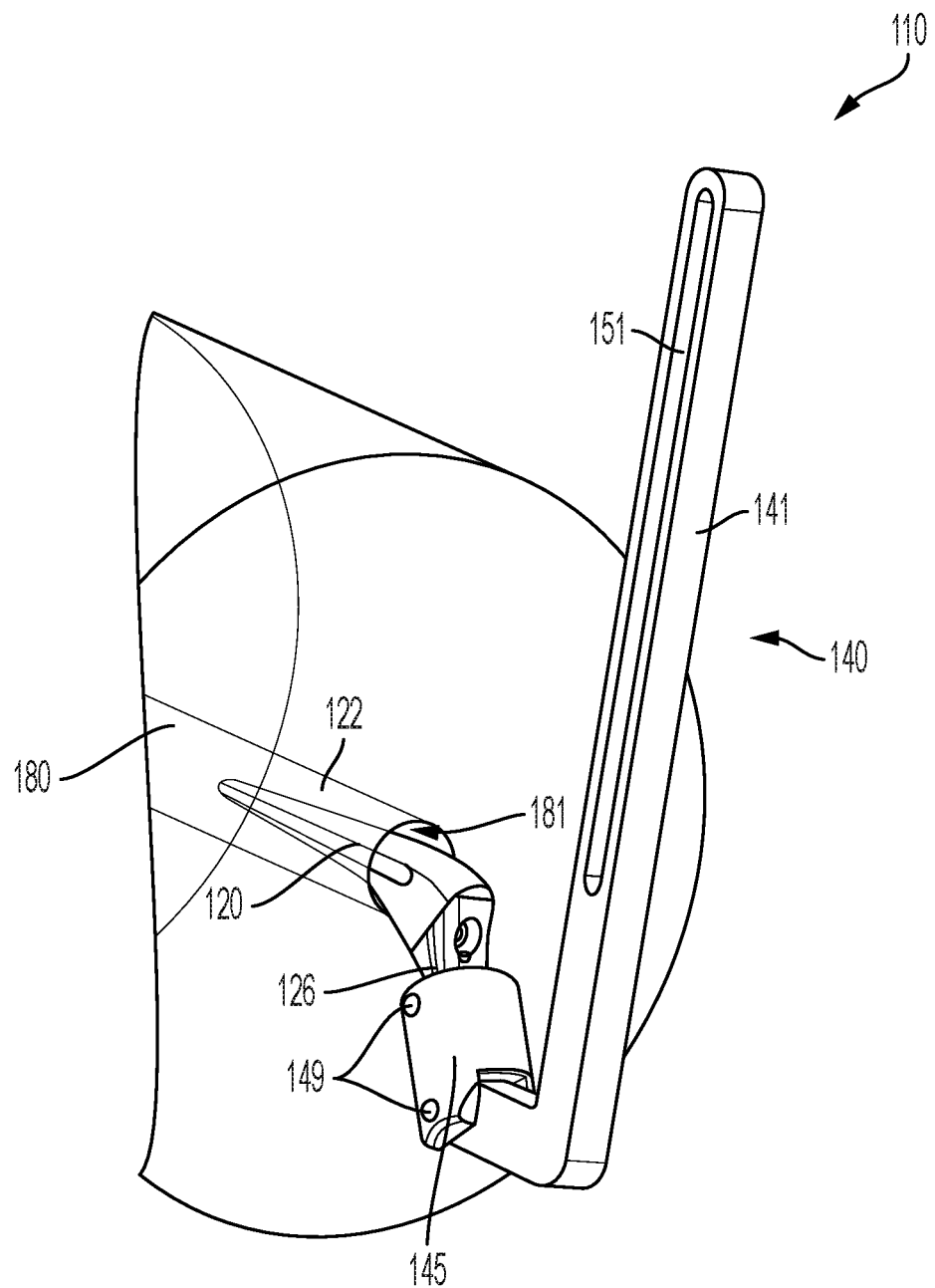
FIGS. 10-14 illustrate a method of removing a well-fixed femoral stem component from a proximal femur according to an embodiment of the disclosure.
Figure 11:
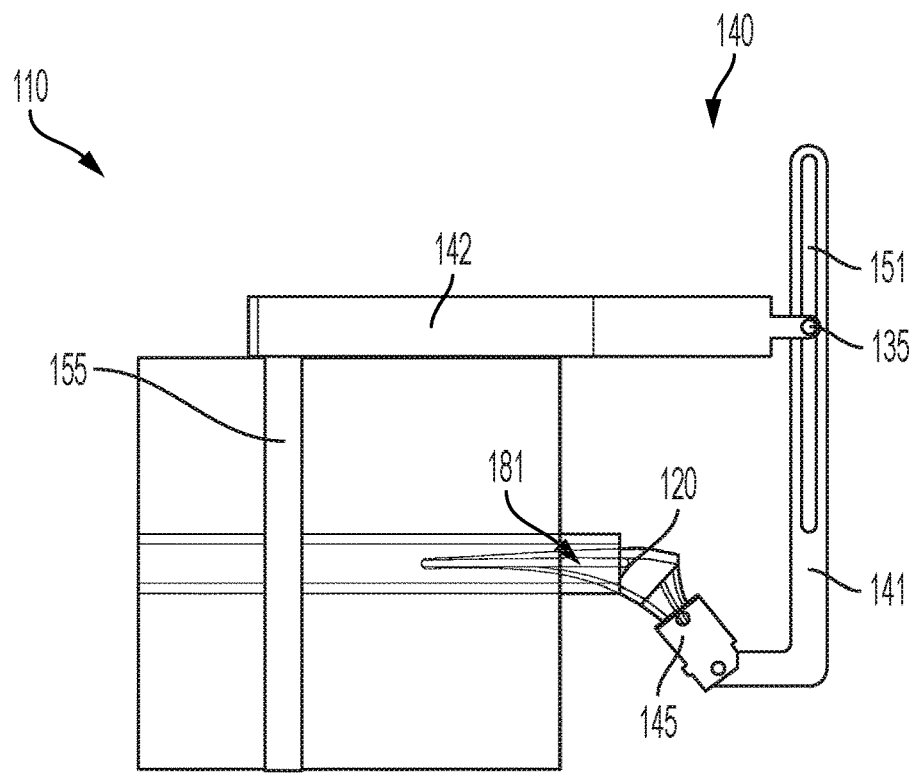
Figure 12:
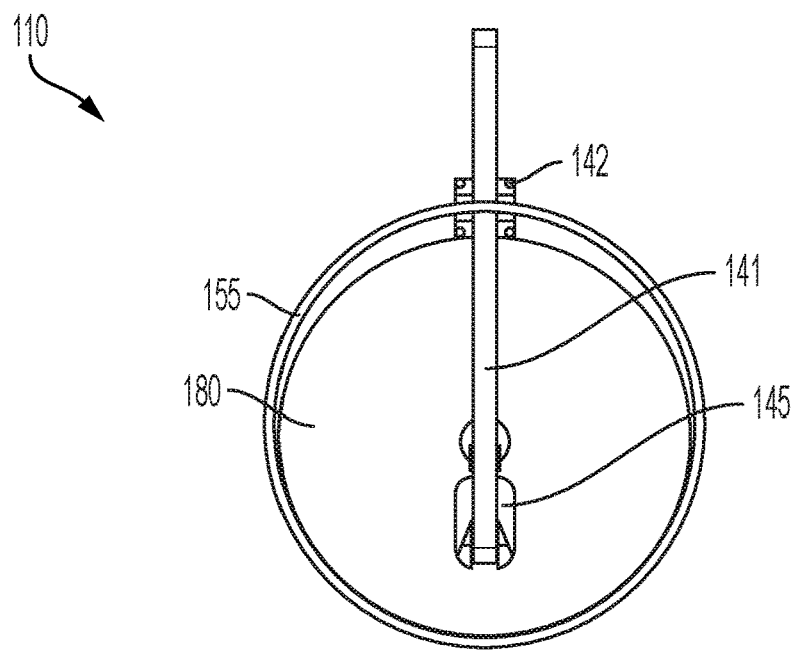

FIG. 9 depicts a slap hammer 90 according to one embodiment of the present disclosure. Slap hammer 90 includes a weighted handle 92, striking member 94, and a guide rod 96. A biasing element (not shown) such as a spring may be positioned over the guide rod 96 adjacent the weighted handle 92. A first end of guide rod 96 is dimensioned to couple with an implanted femoral stem component 20 so it can be removed from the femur 80. Once attached, weighted handle 92 may be slid axially along the guide rod 96 in a direction away from the first end and toward the striking member 94.

A method of removing a well-fixed hip stem component is provided herein. Although the systems and methods described herein relate to hip stems, it is envisioned that the same systems and methods could be employed with other bones and implants through the body. A proximal portion of a patient's hip is first be prepared in a manner that exposes the previously implanted prosthesis. The spherical femoral head component may be removed from trunnion 26 of femoral stem component 20. Once the femoral head component is removed, trunnion 26 of femoral stem component 20 is exposed for attachment of targeting guide 40, as described below.

An operator may assess the length of femoral stem component 20. This may be accomplished preoperatively using X-rays or other visual mapping technologies known in the art or intraoperatively. Once the length and size of femoral stem component 20 is determined, an appropriate size K-wire 60 that is at least as long as the femoral stem component 20 itself can be selected for drilling. Knowing the size of femoral stem component 20 also allows an operator to select a guide hole 44 of targeting guide 40 that will align a drill bit or K-wire with a point on bone 80 offset from distal tip 28 of stem component 20 by the desired gap G, which may be 1 to 6 cm. For example, a longer femoral stem component 20 will generally involve the utilization of a more distal hole 44 than a femoral stem component 20 of relatively shorter length. Lasers or other alignment devices may be implemented to ensure the trajectory of guide hole 44 aligns with the appropriate location.

An operator may then prepare a K-wire 60 with a drill 70. In this regard, a proximal end 62 of K-wire 60 may be placed within a chuck 76 of the drill 70, as shown in FIG. 2. Chuck 76 may be tightened using a rotation force or by using a key to secure the K-wire 60. An operator may then squeeze trigger 72 to rotate K-wire 60 about its longitudinal axis. Controls may be actuated to change the direction of rotation of K-wire 60 such that in one configuration K-wire 60 is configured to be driven into bone and in a second configuration K-wire 60 is configured to be drawn out of bone.

Figure 3:
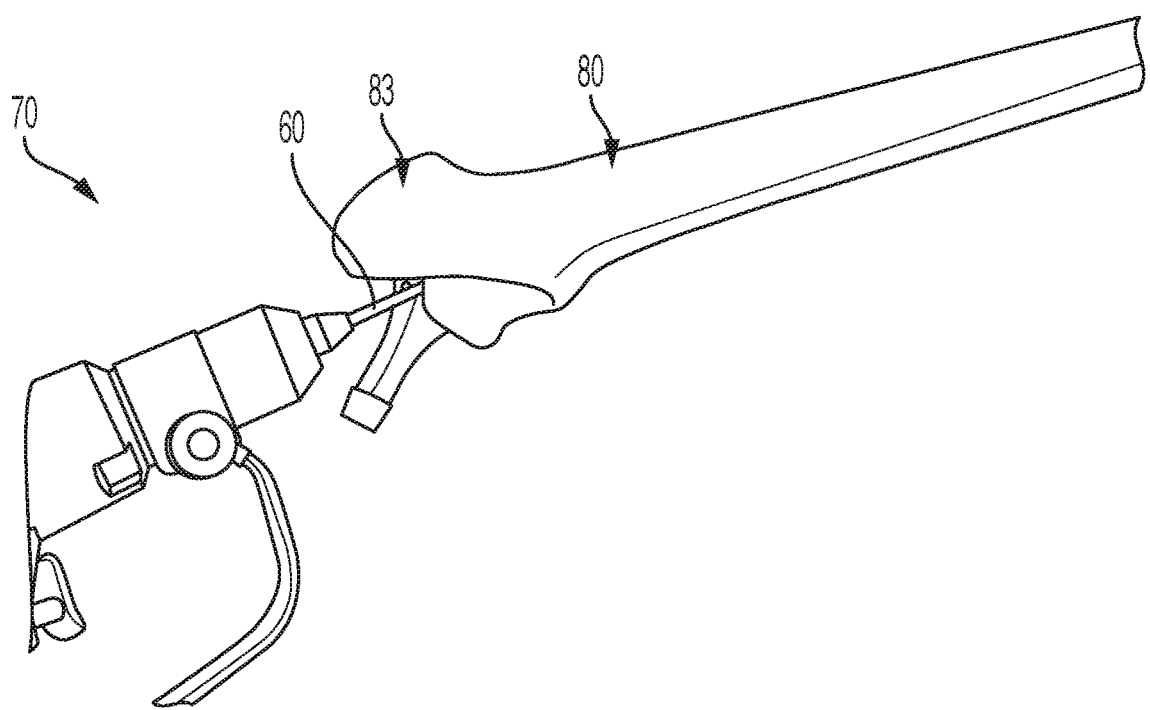
FIGS. 3-9 illustrate a method of using the system of FIGS. 1 and 2 according to an embodiment of the disclosure.
Figure 4:
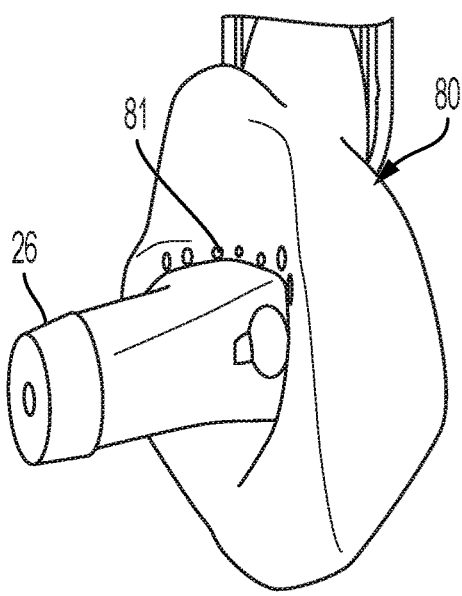

As illustrated in FIGS. 3-4, after the proximal end of femur 80 has been exposed, an operator may align distal tip 64 of K-wire 60 with a proximal portion of femur 80 adjacent to femoral stem component 20. The location of drilling may depend on several factors, such as the size of the femoral stem component 20 and the amount of bone cement used to secure the femoral stem component 20 within the bone 80. The drilling location is preferably located at a point just adjacent to femoral stem component 20 so that K-wire 60 rides along a side surface of stem portion 22 of femoral stem component 20. This allows an operator to later cut around femoral stem component 20 as close to component 20 as possible to preserve as much bone as possible. Once the K-wire 60 is properly placed, K-wire 60 may then be drilled along a longitudinal axis through femur 80, as mentioned, as close to the stem portion 22 as possible to form first bore 81 extending longitudinally within bone 80. Distal tip 64 of K-wire 60 is preferably drilled to a location distal of the distal tip 28 of femoral stem component 20. In such a manner, a first bore 81 that is created by K-wire 60 helps determine the offset gap G beyond distal tip 28 through which a second bore 82 will be drilled to intersect first bore 81, as described below. This gap G may have a length of between 1-6 cm, preferably between 3-4 cm. Once the K-wire 60 has been drilled distally through bone 80, an operator may reverse the direction of the drill 70 to draw K-wire 60 out of the bone 80, creating first bore 81. This may be done once to form a single bore 81 or a plurality of times to form a plurality of bores 81 about stem component 20, as depicted in FIG. 4. The creation of a plurality of bores 81 about stem component 20 can create a path of least resistance to help effectively guide flexible saw 30 to cut as close to femoral stem component 20 as possible.

Targeting guide 40 is then attached to trunnion 26 of the femoral stem component 20 via coupling device 45. However, in other embodiments, targeting guide 40 may be connected to a threaded opening at a proximal end of stem component 20. A proximal end of first arm 41 is attached to trunnion 26 via coupling device 45. Various other locking devices such as clamps or fasteners may be utilized to secure the proximal end of first arm 41 to trunnion 26 while still allowing it to rotate relative to the longitudinal axis of stem component 20. In such a manner, first arm 41 of targeting guide 40 extends from trunnion 26 and may be rotated in any radial direction about the circumference of femur 80. For example, in one embodiment, the first arm 41 may extend from trunnion 26 toward the patient's lateral side, and in another embodiment the first arm 41 may extend toward the patient's anterior side. Next, an operator may determine a desired angle of the second arm 42 of targeting guide 40 relative to first arm 41 and rotate second arm 42 about hinge 43 to achieve the desired angle. Second arm 42 is preferably rotated so that it is parallel or substantially parallel with the longitudinal axis of femur 80. However, in other embodiments it may be desired to rotate the second arm 42 so it is not parallel to femur 80.

Figure 14:
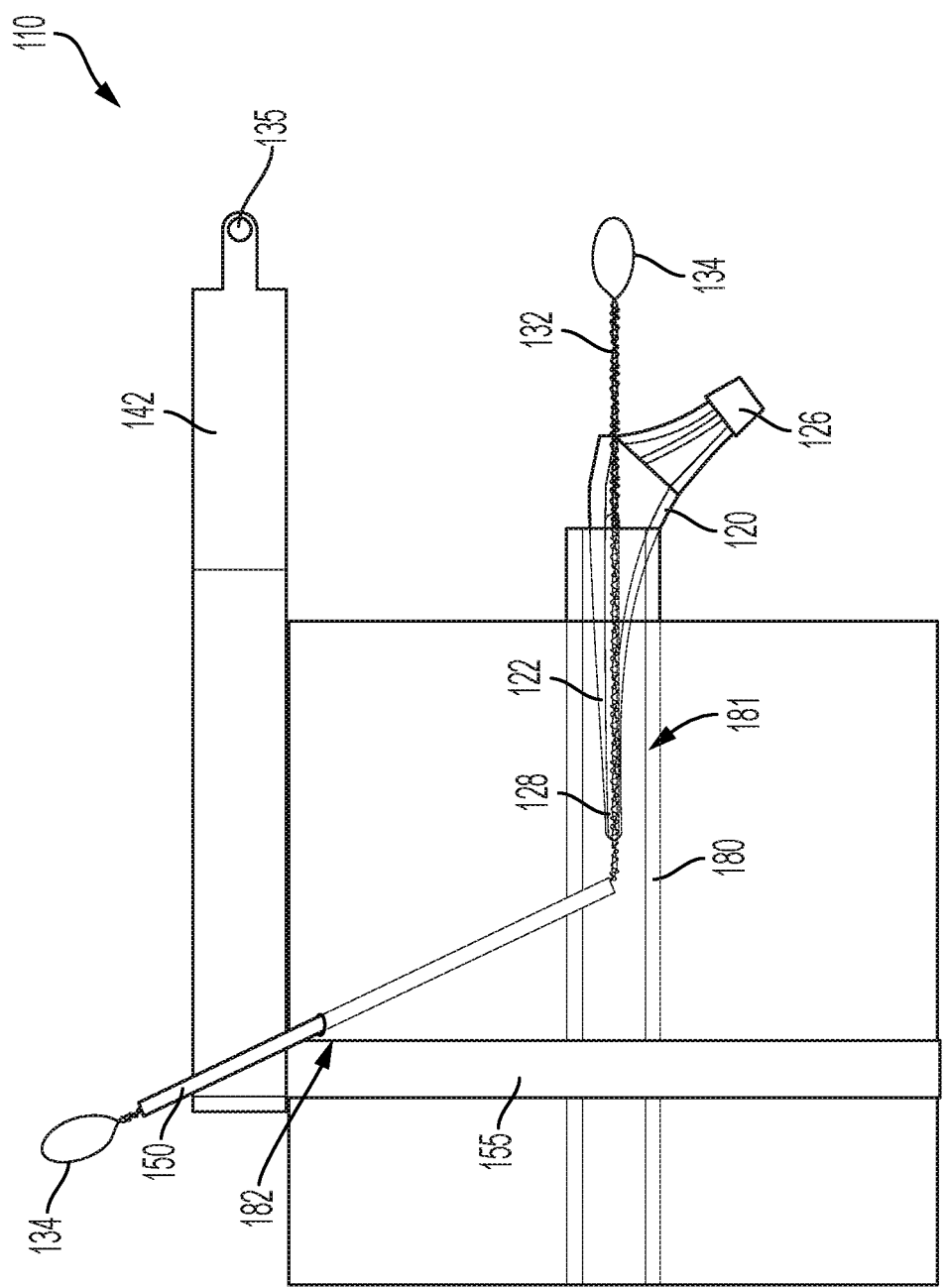

In another embodiment, a method is performed using system 110 as illustrated in FIGS. 10-14. In this method, targeting guide 140 may be implemented rather than targeting guide 40. Targeting guide 140 includes first and second arms 141, 142 that are slidably coupled together. At an end of the targeting guide, one end of coupling device 145 is attached to first arm 141 and an opposite end of the coupling device 145 is attached to a trunnion 126 of a femoral stem component 120. Such an attachment may be facilitated by inserting thumbscrews into holes 149 of coupling device to secure first arm 141 and trunnion 126 thereto. Next, an operator may slide a protruding portion 135 of second arm 142 in a slot 151 of first arm 141 to adjust a spacing of second arm 142 relative to a patient's leg in order for second arm 142 to be properly seated against the patient's leg. Further, as shown in FIG. 13, an operator may adjust and then lock slider 153 along the longitudinal direction of second arm 142 such that slider 153 aligns with a desired drilling location for forming second bore 182 in the femur 180 via passage through hole 102. To secure second arm 142 to the leg of the patient, a band 155 may be wrapped around at least a portion of second arm 142, femur 180, and any additional surrounding tissue. Band 155 may pass through an aperture of second arm 142, wrap entirely around second arm 142, or be secured to second arm 142 via a fastener or other locking mechanism. As illustrated in FIG. 14, once second arm 142 is secured in place, an operator may remove first arm 141 from coupling device 145 and second arm 142 to allow the operator to have more room to access the proximal end of femoral stem component 120.

Figure 5:
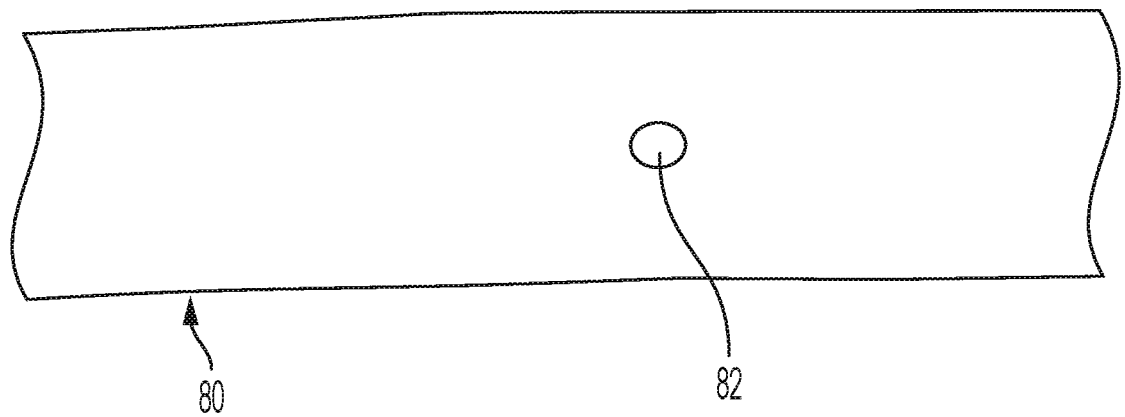

Once targeting guide 40 is secured in place, an operator may use drill 70 to drill a second bore 82 through femur 80 to intersect with first bore 81. Second bore 82, as shown in FIGS. 1 and 5, may be formed using a K-wire, such as K-wire 60, or a drill bit with a larger diameter as known in the art. Second bore 82 preferably intersects with first bore 81 at an angle between 30° and 60° depending on the enclosed angle of the guide holes 44 relative to a longitudinal axis of second arm 42, but it could intersect at other angles such as a 45° to 90° angle depending on the targeting guide 40 implemented. However, guide holes 44 and consequently second bore 82 are generally angled in a distal to proximal direction starting from the outside of the targeting guide, as shown in FIG. 1. This may make it easier to guide flexible saw 30 through bores 81 and 82. As stated herein, visualization assistance such as X-rays or lasers may be implemented to ensure that second bore 82 intersects first bore 81. Second bore 82 is drilled in a similar manner to first bore 81, except that an operator can align the K-wire 60 or drill bit with a guide hole 44 of the second arm 42 to assist in aiming the trajectory of second bore 82.

Once at least the second bore 82 has been drilled, but optionally when both first bore 81 and second bore 82 have been drilled, a bone protector pin 50 (see FIG. 6) may be utilized to protect the bone and tissue surrounding the proximal end and/or the distal end of the hip stem 22. In relation to the distal end, bone protector pin 50 may have an outer diameter that is less than the diameter of the second bore, 82 and an inner diameter that is greater than the diameter of the flexible cutting wire 32. Typically, second bore 82 has a diameter greater than that of first bore 81. Bone protector pin 50 may be passed through a guide hole 44 in targeting guide 40 as shown in FIG. 1, or hole 102 of targeting guide 140 when targeting guide 140 is used, as shown in FIG. 14, so that bone protector pin 50 engages bore 82 at the appropriate angle, as shown in FIG. 1. Alternatively, bone protector pin 50 may be at least partially inserted into second bore 82, 182 without first being passed through a hole of a targeting guide 40, 140. Bone protector pin 50 can be secured to bone 80 via external threads 52 on bone protector pin 50, through press-fit, through a friction fit, or some other mechanism. With bone protector pin 50 engaged to second bore 82, cannula 54 of protector pin is concentrically nested within bore 82 allowing flexible saw 30 to pass through first and second bores 81, 82 and bone protector pin 50. In some examples, targeting guide 40 may be removed from the bone 80. Such removal may be desirable when the targeting guide is not used to help secure bone protector pin 50 to bone 80. In an alternative embodiment, a hollow tube may be inserted through the proximal end of the bone in addition to the use of bone protector pin 50 in conjunction with bore 82, i.e., inserted in a calcar region of a femur, and extend along a longitudinal axis adjacent to the hip stem. As such, two cannulated devices, a bone protector pin and a hollow tube, may be inserted through the first and second bores to aid in the insertion of a flexible cutting wire.

Figure 15:
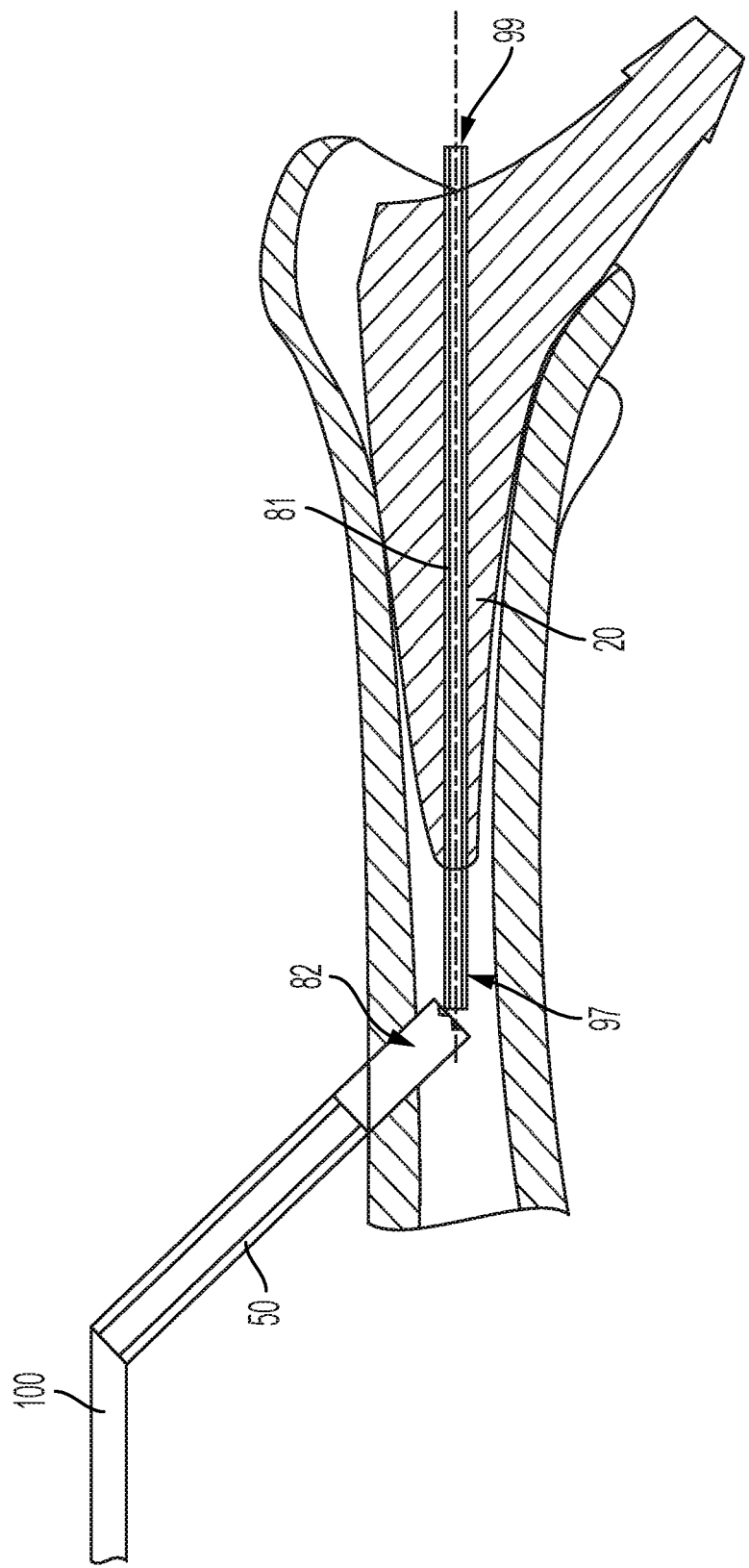
FIG. 15 illustrates hollow tubes used in conjunction with the system of FIGS. 1 and 2.

In another alternative embodiment illustrated in FIG. 15, the above steps may be performed without the use of targeting guide 40 or targeting guide 140. In this embodiment, an operator may directly drill first bore 81 along the longitudinal axis of femur 80 from the exposed proximal end past the distal tip 28 of stem 22. Then, an operator may drill a second bore 82 from a lateral side of femur 80 such that second bore 82 intersects first bore 81. Second bore 82 may be drilled at an acute angle relative to first bore 81.

Continuing with this embodiment of FIG. 15, a hollow tube 99 may also be placed over and through first bore 81 through the proximal end of femur 80. Hollow tube 99 is similar to bone protector pin 50 and is cannulated to allow a flexible cutting wire 32 to be passed therethrough. Hollow tube 99 has an outer diameter smaller than the diameter of first bore 81 and an inner diameter larger than the diameter of flexible cutting wire 32. Hollow tube 99 may be inserted through the proximal opening of first bore 81 and may be pre-loaded with the flexible cutting wire 32 to avoid potential kinking or misalignment of the flexible cutting wire 32, or flexible cutting wire 32 may be inserted into hollow tube 99 after hollow tube 99 is fully inserted into the bone 80. To secure hollow tube 99 within bone 80, hollow tube 99 may be fully inserted into first bore 81 such that the distal end of hollow tube 99 contacts the distal end of bone protector pin 50 at a juncture 97 or is otherwise advanced to be proximate bone protector pin 50 such that a small gap exists between the distal ends of bone protector pin 50 and hollow tube 99 at juncture 97. A friction fit between hollow tube 99 and the bone 80 preferably keeps hollow tube 99 in place without the need for any external fixation features.

In an embodiment in which the hollow tube 99 is pre-loaded with the flexible cutting wire 32 and hollow tube 99 is inserted into bone 80, an operator may insert a distal end 39a, 39b of the grasping tool 38 down a cannulation of bone protector pin 50 to grasp the exposed loop 34 of the flexible cutting wire 32 from the juncture 97. Such grasping may be facilitated by hooking a hook portion 39a of the grasping tool 38 around the loop 34 and pulling the loop 34 through the bone protector pin 50, or may be facilitated by passing a loop portion 39b of grasping tool 38 over loop 34 of flexible cutting wire 32 and pulling loop 34 through the bone protector pin 50. In instances where grasping tool 38 includes a loop 39b, the method may proceed by first advancing the grasping tool through bore 82 to juncture 97. Then, tube 99 with cutting wire 32 preloaded therein may be advanced through bore 81 so that loop 34 catches the wire, allowing for the retrieval of the wire. Alternatively, if hollow tube 99 is not pre-loaded with flexible cutting wire 32 and hollow tube 99 is fully inserted into bone 80, flexible cutting wire 32 is advanced through hollow tube 99 to juncture 97. Where grasping tool 38 includes a hook portion 39a, such tool may be advanced through bore 82 to retrieve the cutting wire 32. Where grasping tool 38 includes a loop 34, an operator may initially insert tool 38 so that loop portion 39b is positioned in juncture 97. Then, loop 34 of flexible cutting wire 32 may be advanced distally through the hollow tube 99 from the proximal opening of first bore 81 toward junction 97 so that loop 34 is received by distal portion 39a, 39b of a grasping tool 38. In each case, grasping tool may then be pulled through bone protector pin 50 to draw out loop 34 end of wire 32. Once loop 34 has been positioned through hollow tube 99 and bone protector pin 50, hollow tube 99 may be removed from first bore 81 by pulling it proximally toward the exposed end of femur 80 until it is removed entirely from femur 80.

In another embodiment in which a hollow tube 99 is not implemented, once first and second bores 81, 82 or 181, 182 are formed and a bone protector pin 50 is inserted into second bore 82, 182, a flexible saw 30 may be utilized to cut the interface 86 between the prosthetic stem 22 and the surrounding bone 80. A first end of flexible saw 30 may then be passed through first bore 81 toward second bore 82 or vice versa. Due to the slight stiffness of flexible saw 30, an operator may simply feed the first end through first bore 81 without kinking or encountering a resistive force. This feeding is also facilitated by the relative angles between first and second bores 81, 82 and the distal to proximal orientation of second bore 82. To pull the first end of flexible saw 30 through second bore 82, a distal end of a grasping tool 38 may be passed through either cannula 54 of bone protector pin 50 or through second bore 82 such that the distal end 39a, 39b either hooks around or loops around a portion of a loop 34 of flexible cutting wire 32. The grasping tool 38 may then be used to pull a flexible cutting wire 32 out of second bore 82, and then a cannula 43 of bone protector pin 50 may be placed over the flexible cutting wire 32 adjacent the bone 80. Aiming guide 40 may also be removed at this point of the method as well once first end of saw 30 has been pulled through first bore 81, second bore 82, and cannula 54 of bone protector pin 60. Both first and second ends of flexible saw 30, which at this point may be in the form of a wire, may then be formed into respective loops 34 using the methods described herein and as shown in FIG. 1.

In another alternative embodiment, rather than drilling first and second bores 81, 82 with K-wire 60, a cannulated drill bit may be utilized to facilitate the drilling of both first and second bores 81, 82. The cannulated drill bit may have a length that extends along a longitudinal axis. The cannula may be centrally disposed in the drill bit such that a center of the cannula is coincident with the longitudinal axis. A cannulated drill bit may be advantageous over K-wire 60 because a flexible cutting wire 32 may be pre-loaded within the cannula of the cannulated drill bit, and such an arrangement would reduce the difficulty of passing the flexible cutting wire 32 through first and second bores 81, 82. In use, flexible cutting wire 32 may be placed into the cannula of a drill bit before either first or second bore 81, 82 are formed. An operator may then drill the first bore 81 in a manner such that the flexible cutting wire 32 is pushed out of the distal end of the cannulated drill bit at the distal-most point of first bore 81. Alternatively, a cannulated drill bit may be used to drill first bore 81 without pre-loading a flexible cutting wire 32. As such, the cannulated drill bit may be fully driven into the bone 80 and then detached from the drill to act as a hollow protector tube in which a flexible cutting wire 32 can be inserted. An operator may then drill a second bore 82 using a cannulated drill bit, standard drill bit, or k-wire to intersect first bore 81 at a transverse angle relative to first bore 81. A retrieving instrument may then be inserted into second bore 82 to pull flexible cutting wire 32 from the distal-most region of bore 81 and out of the bone via passage through second bore 82. Such a cannulated drill bit may be implemented in embodiments using either targeting guide 40 or targeting guide 140.

Figure 8:
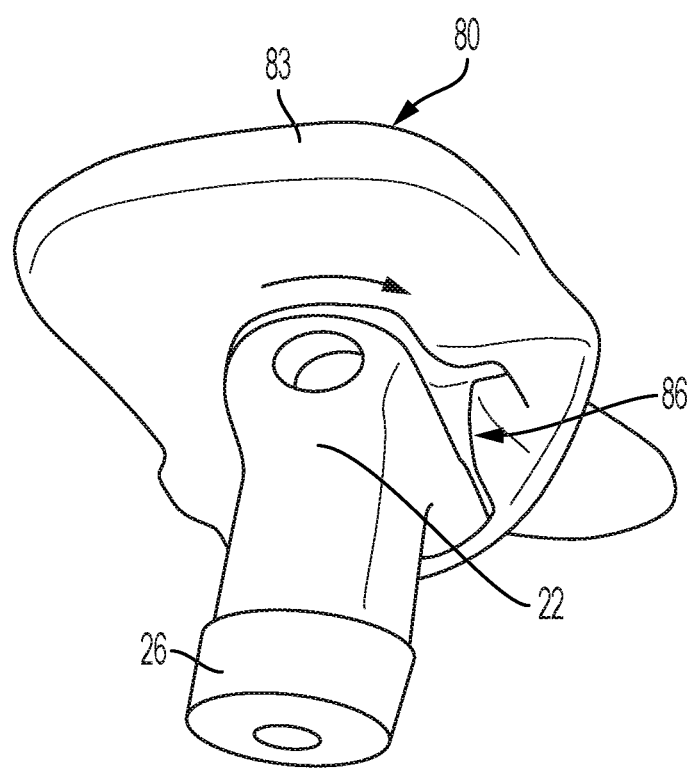

For either system 10 or system 110, the following steps relating to the cutting steps may be implemented. As such, the remaining steps are only described in relation to system 10 for brevity. The loops 34 of the first and second ends of flexible saw 30 may then be connected to handles 38. As described herein, handles 38 have hooks 39 or the like to attach to loops 34. Once the handles 38 have been attached to flexible saw 80, an operator can begin the cutting operation. This generally involves an operator grabbing both handles 38 and pulling one grasping tool 38 and consequently a loop end 34 a distance in a first direction, and then pulling the other grasping tool 38 and the other loop end 34 a distance in a second direction. Alternatively, two operators can operate the cutting by each grabbing a single grasping tool 38 and only pulling the saw 30 in a single direction opposite of the other direction moved by the other operator. This method may be advantageous as it could reduce the fatigue that a single operator would experience if the operator were to pull both handles alone and provide for optimal cutting leverage. This motion is repeated back and forth to cause flexible saw 30 to cut bone and/or bone cement at the interface 86 with stem portion 22. The back and forth cutting motion is repeated while also moving wire around an exterior of femoral stem component 20 until flexible saw 30 cuts through sufficient portions of bone and/or bone cement that allow femoral stem component 20 to loosen from bone 80. As flexible saw 30 is moved in such a back-and-forth motion, cortical bone surrounding second bore 82 is protected by bone protector pin 50. In other words, bone protector pin 50 shields bone 80 from being cut by flexible saw 30. In such a manner, flexible saw 30 is advanced 360° around the circumference of femoral stem component 16 to loosen it from bone 80 as illustrated by the clockwise arrow in FIG. 8. In other embodiments, flexible saw 30 may only cut partially around the circumference of femoral stem component 20, such as a 90 degree clockwise cut. While cutting through the bone and/or bone cement surrounding femoral stem component 20, an operator may visually notice femoral stem component 20 loosening from bone. Alternatively, an operator may pull or otherwise contact femoral stem component 20 to observe whether it has loosened from the surrounding bone 80.

After femoral stem component 20 has been loosened from the surrounding bone interface, flexible saw 30 is removed. This can be accomplished by reversing the steps listed above. First, the 38 are removed from loop ends 34. Flexible saw 30 may then be pulled through either first bore 81 or second bore 82 to be removed. Next and finally, bone protector pin 50 is removed.

To assist in the removal of femoral stem component 20 from femur 80 after femoral stem component 20 has been cut using the methods described herein, slap hammer 90 can be attached to a proximal portion of femoral stem component 20. A first end of guide rod 96 may be coupled to a proximal end of femoral stem component 20 or a proximal portion of femoral stem component 20 by threading, hooking, punching, or using another attachment type known in the art to secure guide rod 96 to femoral stem component 20. An operator may then repeatedly slide weighted handle 92 along guide rod 96 away from femoral component 20 via a striking member 94. The force of weighted handle 92 and the impacts from striking member 94 pulls femoral stem component 20 proximally out of femur 80. Once femoral stem component 20 has been removed from femur 80, the femur 80 can be prepared for insertion of another prosthesis.

First arm 41 and second arm 42 may be formed from a variety of materials including polymers such as Polypropylene (PP) or Acrylonitrile Butadiene Styrene (ABS), metals such as aluminum or stainless steel, or hybrids thereof. Certain polymers may be formed through additive manufacturing processes, molding processes, or the like. Metallic components may be formed through machining processes, milling processes, and the like.

A kit may be provided that includes each component described herein necessary to remove a well-fixed stem. For example, a kit may include one or more of a flexible saw 30, k-wire 60, cannulated drill bit, handles 38, targeting guide 40, coupling device 45, bone protector pin 50, band 55, drill 70, and slap hammer 90. A kit may also include two or more of any one instrument. In some kits, an operator may select certain optional components to best fit the particular application at hand. For example, an operator may select to drill using a k-wire 60 or a cannulated drill bit. An operator may also select to use the targeting guide 40 illustrated in FIG. 1 or the targeting guide 140 illustrated in FIG. 11.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangement may be devised without departing from the spirit and scope of the present invention as defined by the appended claims.

The invention claimed is:

1. A method for removing a prosthetic hip stem from a bone comprising:
   drilling a channel through the bone at a first surface location on the bone adjacent to the prosthetic hip stem such that the channel extends from a proximal end to a distal end of the prosthetic stem, the channel defining a longitudinal first axis;
   drilling a hole at a second surface location on the bone separate from the first surface location, the hole being formed along a second axis through the bone adjacent to the distal end of the prosthetic hip stem such that the channel and the hole intersect;
   inserting a first end of a cutting wire through the channel and the hole; and
   cutting an interface between the hip stem and the bone with the cutting wire.

2. The method according to claim 1, further comprising attaching a targeting guide to the prosthetic hip stem.

3. The method according to claim 2, wherein the attaching step includes attaching the targeting device to a trunnion of the prosthetic hip stem.

4. The method according to claim 2, wherein the step of drilling the hole along the second axis includes driving a drill bit through a hole of the targeting guide toward the bone.

5. The method according to claim 1, further comprising attaching a bone protector pin to the hole in the bone.

6. The method according to claim 5, where the inserting step includes inserting the cutting wire through the bone protector pin.

7. The method according to claim 6, wherein the cutting step includes moving the cutting wire back and forth along the first and second axes.

8. The method according to claim 1, wherein the attaching step includes inserting the bone protector pin through a targeting device attached to the prosthetic hip stem.

9. The method according to claim 1, wherein the step of drilling the hole includes drilling the hole at an oblique angle relative to the channel.

10. The method according to claim 9, wherein the oblique angle is formed by an intersection between the first and second axes and is between 30 degrees and 60 degrees.

11. The method according to claim 1, wherein the step of drilling the hole through the distal end of the prosthetic hip stem includes drilling the hole 3 cm to 6 cm offset from the distal end of the hip stem.

12. The method according to claim 1, wherein the step of drilling the channel includes drilling a K-wire from the proximal end of the bone to a location beyond the distal end of the prosthetic hip stem.

13. The method according to claim 1, wherein the step of drilling the channel includes preloading the cutting wire in a cannulated drill bit and driving the cannulated drill bit through the channel.

14. A method of removing an implant from bone comprising:
   drilling a channel along a first axis through the bone adjacent to the implant from a first end of the implant to a second end of the implant;
   attaching a targeting guide to the first end of the implant;
   subsequent to positioning the drill through a guide hole of the targeting guide, drilling a hole along a second axis into the bone such that the hole intersects the channel at a transverse angle adjacent to the second end of the implant;
   inserting a first end of a cutting wire through the channel and the hole; and
   cutting at least one of bone and bone cement adjacent to the implant with the cutting wire.

15. The method according to claim 14, further comprising preoperatively assessing a length of the implant.

16. The method according to claim 15, wherein the guide hole of targeting guide comprises a plurality of guide holes, and the method further comprises selecting a first guide hole of the plurality of guide holes in the targeting device to drill through based on the assessed length of the implant.

17. The method according to claim 16, wherein the first guide hole defines a guide axis intersecting the bone at a location 1 cm to 6 cm offset from the second end of the implant.

18. The method according to claim 14, further comprising inserting the first end of the cutting wire through a bone protector pin extending into the bone through the hole.

19. The method according to claim 14, further comprising removing the implant via a slap hammer.

20. A system for removing an implant from bone comprising:
- a Kirschner wire configured to be connected to a drill and drilled into bone;
- a targeting guide having a first portion and a second portion, the first portion having a plurality of guide holes and the second portion being configured to connect to the implant such that an elongate dimension of the first portion extends alongside an elongate dimension of the implant;
- a drill bit configured to be connected to the drill and driven through one of the guide holes in the targeting guide and into bone;
- a cutting wire having first and second ends and a length extending therebetween, the cutting wire being flexible along its length; and
- a bone protector pin having a first end, a second end, and an opening extending through the first and second ends, the first end being configured to connect to a bone hole in bone, the opening being dimensioned to receive the cutting wire.

* * * * *